Aug. 11, 1959 G. V. IRELAND 2,898,652
V-BELT FASTENER
Filed May 31, 1957
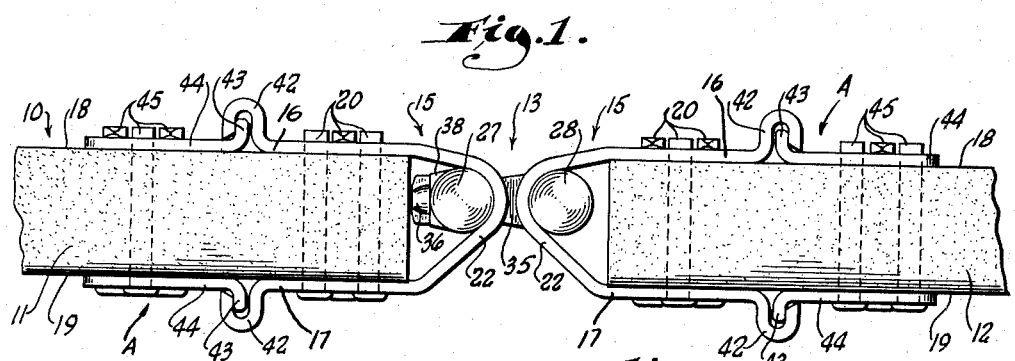
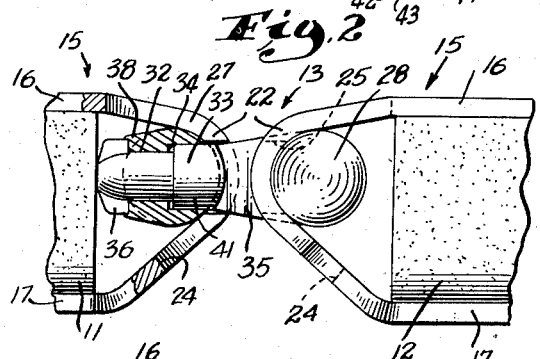
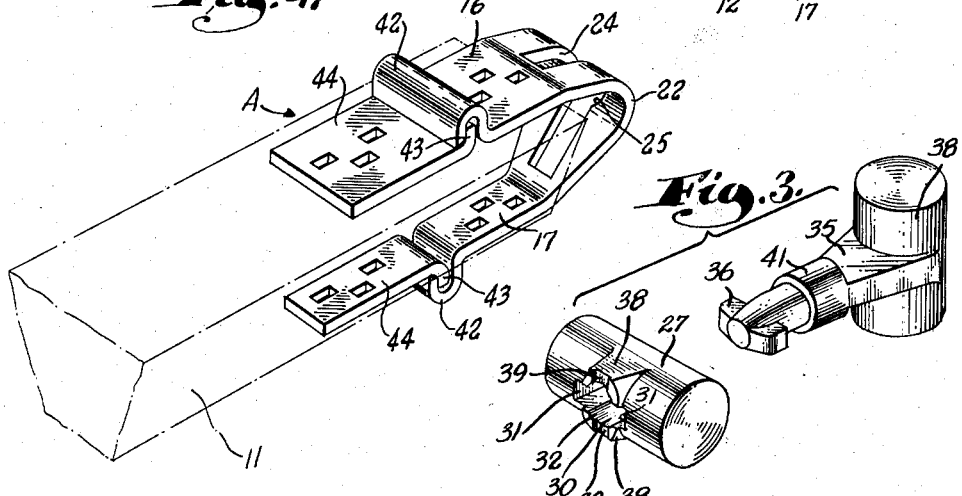
Inventor
Glen V. Ireland
By
Attorney

United States Patent Office 2,898,652
Patented Aug. 11, 1959

2,898,652

V-BELT FASTENER

Glen V. Ireland, Wauwatosa, Wis.

Application May 31, 1957, Serial No. 662,697

2 Claims. (Cl. 24—33)

This invention relates to V-belt drives and refers more particularly to fasteners for joining the opposite ends of a length of V-belting to form the same into an endless belt. In a more specific sense, this invention concerns the problem of securely anchoring such connectors to the ends of the belt connected thereby.

Either single or multiple strands of so-called open end V-belting with separable fasteners on their opposite ends now make it possible for belt drives to be established and maintained in many types of machinery without the necessity of dismantling or of disturbing the installation. Moreover, it is now possible with the use of such fasteners to employ V-belt drives in many cases where it would be impossible to install endless V-belts.

In general, V-belt fasteners of this character comprise a bearing bracket or saddle permanently fixed to each end of a length of V-belting, and a double hinged joint interconnecting the bearing brackets or saddles and providing for relative hinging motion between the belt ends about each of two transverse axes intermediate the belt ends, as is necessary when the latter pass over the V-pulleys about which the belt is trained.

Despite their advantages past V-belt fasteners of this nature had serious shortcomings. The fasteners were usually riveted to the belt at more or less localized areas close to the ends of the belt. Thus in cases where such belts were subjected to considerable tension, the riveted ends of the saddles were frequently pulled off of the belt ends by failure of the belt material itself to withstand such tension without tearing.

With this objection in mind, it is the object of this invention to provide a fastener for V-belts wherein greater assurance is had against the saddles of the fastener becoming detached from the belt ends.

More specifically, it is an object of this invention to provide a V-belt fastener of the character described with auxiliary anchoring means for more securely holding the fastener connected to the belt, without interfering with travel of the fastener around the pulleys about which the belt may be trained.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of a length of V-belting having its opposite ends connected by a fastener secured to the belt in accordance with this invention;

Figure 2 is an enlarged fragmentary view of part of the fastener means shown in Figure 1, portions thereof being broken away and shown in section;

Figure 3 is a group perspective view of the cooperating hinge pins by which the components of the fastener are readily separably interconnected; and Figure 4 is a perspective view of one of the saddle components illustrated in Figure 1.

Referring now more particularly to the accompanying drawings, in which like reference characters have been applied to like parts throughout the several views, the numeral 10 generally designates a length of V-belting having opposite left and right end portions 11 and 12, respectively, separably joined together by a fastener 13.

The fastener 13, which may be of any desired type which preferably detachably connects the belt ends, is here shown as comprising a pair of opposite bearing brackets or saddles 15 which are provided by substantially U-shaped straps having parallel upper and lower legs 16 and 17, respectively, between which the end portions 11 and 12 of the belt are snugly received. The upper legs 16 of the saddles are wider than the lower legs 17 and overlie the wider outer faces 18 of the belt ends. The narrower legs 17 engage the inner faces 19 of the belt, and both the upper and lower arms are narrower than the respective faces of the belt which they overlie so as to clear the converging side walls of a sheave or V-pulley about which the belt may be trained.

A plurality of flat nails 20 received in aligned holes in the upper and lower legs 16 and 17 of each of the bearing brackets or saddles 15, and passing through the thickness of the belt, provide permanent riveted connections between the saddles and the belt ends. As shown in Figure 1, the heads of the nails overlie the outer surfaces of the narrower legs 17 of the saddles, while the free outer ends of the nails are bent over against the outer surfaces of the wider upper legs 16.

The bight portions 22 of the saddles are spaced outwardly from the adjacent extremities of the belt ends, and while their convex surfaces oppose one another, their concave bearing surfaces face the extremities of the belt ends. The bight portions 22 thus provide cylindrically surfaced bearing sockets having parallel transversely extending axes which preferably intersect the neutral axis of the V-belt.

In addition, each of the bight portions is provided with a substantially narrow vertical slit 24 therein, extending in opposite directions from a centrally disposed widened portion 25 at the extreme bottom of the socket. The widened portions 25 of the slits may be round and they align with one another on the neutral axis of the belt when the belt ends are parallel as shown in Figures 1 and 2.

Loosely received in the bearing sockets and held thereby against separation from the adjacent belt ends are hinge pins 27 and 28, respectively, the pin 27 seating in the socket on the lefthand end of the belt and the pin 28 seating in the socket on the righthand end of the belt. The bearing sockets normally hold the pins with their axes parallel to one another and extending across the adjacent ends of the belt, and also provide for rocking motion of the pins on their axes.

The lefthand hinge pin 27 may be considered as a female connector since it has a keyhole shaped opening 30 extending transversely therethrough medially of its ends, and consisting of a bit receiving slot 31 extending lengthwise toward each end of the pin from a larger central stem receiving aperture 32. As shown best in Figure 2, the stem receiving portion of the keyhole opening in the female connector is round, and it opens toward the cylindrical bearing surface of the saddle through a slightly enlarged counterbore 33 so that an outwardly facing substantially annular shoulder 34 is defined in the keyhole, medially of the hinge pin. The counterbore 33 and its mouth normally align with the widened portion 25 of the slit in the lefthand saddle.

The righthand hinge pin 28 may be considered as a male connector by reason of the fact that it has a radial stem 35 thereon projecting from the outer side of the pin 28, intermediate its ends, and passing loosely through the slits 24 in both saddles as well as through the keyhole in the hinge pin or female connector 27. The stem 35 provides a key having a T-shaped bit 36 on its outer end projecting laterally from diametrically opposite sides of the stem and of a width slightly less than the longitudinal dimension of the slot 31 in the female connector so as to readily pass therethrough when the two hinge pins are held in a key inserting and withdrawing position with their axes substantially crosswise of one another.

The bit 36 on the outer end of the key provides shoulders on the key flanking opposite sides of its stem and facing toward the hinge pin 28 to normally engage the inner side of the hinge pin 27 when the axes of the hinge pins are disposed parallel to one another to thus hold the hinge pins and the saddles as well as the belts ends to which they are fixed against separating motion.

The establishment of the double hinged joint between the belt ends requires the hinge pin or female connector 27 to be held in its bearing socket with the fingers of the left hand, while the hinge pin or male connector 28 is held engaged in its bearing socket with the fingers of the right hand. The righthand end of the belt, for example, may be turned on its longitudinal axis through and angle of 90° to dispose the hinge pin 28 crosswise of the pin 27. When thus oriented, the bit on the outer end of the stem 35 of the male connector is inserted through the widened portion 25 of the slit in the saddle on the lefthand end of the belt and through the keyhole shaped opening in the female connector to bring its bit end into the space between the female connector and the extremity of the lefthand end of the belt. Thereafter the righthand end of the belt is turned back to its normal position at which the wider faces of both belt ends are uppermost, to carry the bit of the key out of alignment with the bit receiving slot 31 in the female connector and to engage the shoulders on the underside of the bit with the inner surface of the female connector 27.

When thus connected, the slits 24 in the bight portions of both saddles accommodate the stem portion on the male during pivotal motion of the belt ends about the transverse axes of the hinge pins 27 and 28, and thus provide for whatever relative motion between the belt ends is necessary as they pass over the peripheries of the V-pulleys about which the belt may be trained.

As will be apparent the double hinged joint which is provided by the male and female connectors may be readily disconnected by a procedure which is the reverse of that described for connecting the belt ends together.

If desired, line contact between the underside of the T-shaped bit 36 on the key with the inner side of the female connector 27 may be avoided through the provision of bosses 38 on the female connector projecting from the inner side thereof circumferentially adjacent to each side of the aperture 32. These bosses have aligning shallow notches 39 therein to receive the underside of the bit and provide a flat surface for engagement therewith. The notches 39 also largely prevent accidental rotation of the male connector toward the key removing and inserting position at which the axes of the hinge pins are crosswise of one another.

A cylindrical collar 41 formed on the flat stem of the key, substantially medially of its ends, has a diameter to rotatably fit the counterbore 33 of the keyhole opening in the female connector and serves to guide the two connectors for relative rotation to and from their key inserting and removing position. The collar is also engageable with the shoulder 34 at the bottom of the counterbore during insertion of the key in the keyhole to limit the extent to which the bit end of the key will be projected through the keyhole.

When the male and female connectors are properly interconnected and the underside of the T-shaped bit on the key is held engaged in the shallow notches 39 on the inner side of the hinge pin 27 under the normal tension of the belt on its pulleys, the collar 41 on the key stem is spaced slightly from the bottom 34 of the counterbore. This space may, if desired, accommodate a resilient washer (not shown) of rubber or similar elastic material encircling the stem ahead of the collar 41 to yieldingly resist disengagement of the bit 36 of the key from the notches 39 and thus guard against accidental rotation of the male connector toward the key inserting and withdrawing position during the manipulation of the belt necessary to engage it around its pulleys.

According to this invention assurance is had against the riveted ends of the saddles pulling loose from the belt ends by the provision of auxiliary saddle anchoring means, generally designated A.

The auxiliary anchoring means A consist in two pairs of flat metal clips 44 fixed to the belt inwardly of but endwise adjacent to the extremities of the saddle legs 16 and 17, and substantially loose hinge connections between the anchoring clips and their respective saddle legs. The clips 44 are rectangularly shaped pieces of metal of substantially the same thickness as the saddle legs, and each has a width substantially corresponding to that of its adjacent saddle leg. The clips 44, of course, seat upon the inner and outer faces of the belt and they are permanently secured thereto by nails 45 similar to those used to secure the saddles to the belt ends.

The hinge connection between each saddle leg and its auxiliary anchoring clip 44 comprises cooperating hinge members 42 and 43. The hinge members 42 are formed on the saddle legs, by bending the extremity of each saddle leg outwardly and then back toward the belt to provide a channel having spaced sides which extend transversely across the entire width of the leg, with the channel opening toward the adjacent face of the belt. The hinge members 43 are formed on the anchoring clips, and each comprises a short outstanding flange extending outwardly away from the belt and received in the channel-like hinge member 42 on the adjacent saddle leg. Normally the channels 42 on the saddle legs engage the faces of the flanges 43 which are remote from the belt ends as long as there is tension on the belt, but it should be noted that the flanges are substantially loosely received in the channels 42 on the saddles so as not to interfere with flexing of the belt ends as they pass around the pulleys about which the belt is trained.

The anchoring clips 44 thus cooperate with the normal securing means for the saddles on the belt ends to provide a much more secure connection between the saddles and the belt ends than is possible when only three nails are relied upon to secure the saddles to the belts. In fact, the use of the auxiliary anchoring means of this invention gives the effect of twice as many nails holding the saddles onto the belt ends than is the case when the anchoring means of this invention is not used, without unduly limiting the flexing characteristics of the belt.

From the foregoing description taken together with the accompanying drawings, it will be readily apparent to those skilled in the art that this invention provides a simple and inexpensive but reliable means for use with V-belt connectors, to assure against the connectors being torn from their positions on the belt ends.

What I claim as my invention is:

1. An open end V-belt of the type wherein U-shaped saddles connected to the opposite ends of the belt with their legs engaged over the parallel inner and outer faces of the belt are interconnected with one another by a separable hinged joint to thus provide an endless belt, characterized by the provision of means for reinforcing the connection between the saddles and the belt ends, said reinforcing means comprising: a pair of anchoring clips secured to the inner and outer faces of the belt at each end thereof, inwardly adjacent to the extremities of the legs of the saddle thereon, said clips having short outstanding transverse flanges extending outwardly from their ends which are adjacent to the extremities of the saddle legs and extend entirely across the clips; and means on said extremities of the saddle legs providing transverse channels extending entirely across the legs and opening inwardly toward the adjacent face of the belt, and adapted to be engaged over said flanges to interconnect each leg with its adjacent clip, said channels loosely engaging the clip flanges so as to provide for a degree of flexure of those portions of the belt ends which are embraced by the clips relative to those portions of the belt ends which are embraced by the legs of the adjacent saddle.

2. An endless V-belt comprising: a length of V belting; a pair of U-shaped saddles each having opposite leg members engaged over the parallel inner and outer faces of the belting at one end thereof and riveted thereto; means providing a separable hinged joint between said saddles so as to form the belting into an endless belt; and means providing a pair of auxiliary connections between each saddle and the belt end portion to which it is secured so as to assure against accidental detachment of the saddle therefrom, said last named means comprising a pair of clip members near each end of the belt secured in positions overlying the inner and outer faces of the belt by fastening means extending through the belt, each such clip member being inwardly adjacent to one of the leg members of a saddle, and means providing a hinge connection between each clip member and its adjacent saddle leg member, at the adjacent ends of said members, said last named means comprising a transverse channel on one of said members opening toward the adjacent face of the belt, and a transverse flange on the other of said members projecting away from the adjacent face of the belt and loosely engaged in said channel so as to provide for a degree of flexure of those portions of the belt embraced by the clip members relative to those portions of the belt ends embraced by the leg members of the adjacent saddle.

References Cited in the file of this patent

UNITED STATES PATENTS

| 2,170,973 | Olsen | Aug. 29, 1939 |
| 2,651,095 | Kates | Sept. 8, 1953 |

FOREIGN PATENTS

| 15,089 | Great Britain | Oct. 25, 1915 |
| 24,343 | Great Britain | Oct. 27, 1913 |
| 574,192 | Great Britain | Dec. 27, 1945 |